United States Patent [19]

McKinney et al.

[11] Patent Number: 4,529,764
[45] Date of Patent: Jul. 16, 1985

[54] OLEFIN POLYMERS CONTAINING AMIDES AND INORGANICS

[75] Inventors: Osborne K. McKinney; David P. Flores, both of Lake Jackson, Tex.

[73] Assignee: The Dow Chemical Company, Midland, Mich.

[21] Appl. No.: 575,255

[22] Filed: Jan. 30, 1984

Related U.S. Application Data

[60] Division of Ser. No. 365,431, Apr. 5, 1982, Pat. No. 4,430,289, which is a continuation-in-part of Ser. No. 256,268, Apr. 21, 1981, Pat. No. 4,394,474.

[51] Int. Cl.$^3$ ................................................ C08K 5/20
[52] U.S. Cl. ..................................... 524/232; 524/528
[58] Field of Search .............................. 524/232, 528

[56] References Cited

U.S. PATENT DOCUMENTS

| 2,770,608 | 11/1956 | Barker et al. | 524/232 |
| 3,104,232 | 9/1963 | Clark et al. | 524/232 |
| 3,330,796 | 7/1967 | Mock et al. | 524/232 |
| 3,467,568 | 9/1969 | Williams, Jr. et al. | 524/232 |
| 3,562,291 | 2/1971 | Lutzmann | 524/232 |
| 3,595,827 | 7/1971 | Foster | 524/230 |
| 3,763,059 | 10/1973 | Needham et al. | 524/232 |
| 4,394,474 | 7/1983 | McKinney et al. | 524/232 |

Primary Examiner—Paul R. Michl
Assistant Examiner—N. Sarofim
Attorney, Agent, or Firm—W. J. Lee

[57] ABSTRACT

Blown films of LLDPE having reduced block and increased slip are provided by incorporating into the polymer, before blowing into films, effective amounts of certain fatty acid amides and inorganic materials which provide fast bloom, thereby obtaining an expedient effect of the additives on the surface properties of the blown film.

14 Claims, No Drawings

OLEFIN POLYMERS CONTAINING AMIDES AND INORGANICS

CROSS-REFERENCE TO RELATED APPLICATION

This application is a divisional of application Ser. No. 365,431, filed Apr. 5, 1982 (now U.S. Pat. No. 4,430,289) which is, itself, a continuation-in-part of our application Ser. No. 256,268 filed Apr. 21, 1981 (now U.S. Pat. No. 4,394,474).

BACKGROUND OF THE INVENTION

There are various high molecular weight olefin polymers and copolymers which are suitable in making extrusion-blown films for commercial purposes. Such extrusion-blown films are generally made by extrusion of the molten polymer through an annular die and inflated by the well-known bubble technique.

There are, basically, two types of olefin polymerization techniques for preparing high molecular weight olefin polymers and copolymers. The oldest commercial technique involves high pressure, high temperature, and the use of a free radical initiator, such as a peroxide; these type polymers are generally known as low density polyethylene (LDPE) and are also known as ICI-type polyethylenes. These LDPE polymers contain branched chains of polymerized monomer units pendent from the main polymer "backbone" and generally have densities in the range of about 0.910–0.935 gms./cc.

The other commercially-used technique involves coordination catalysts of the "Ziegler" type or "Phillips" type and includes variations of the Ziegler type, such as the Natta type. These catalysts may be used at very high pressures, but are generally used at very low or intermediate pressures. The products made by these coordination catalysts are generally known as "linear" polymers because of the substantial absence of branched chains of polymerized monomer units pendent from the main polymer "backbone", and they are also generally known as high density polyethylene (HDPE). It is these "linear" polymers to which the present invention pertains. Linear polyethylene (HDPE) ordinarily has a density in the range of 0.941 to 0.965 gms./cc.

In particular, the present invention pertains to "linear" type ethylene polymers wherein ethylene has been polymerized along with minor amounts of alpha, beta-ethylenically unsaturated alkenes having from 3 to 12 carbons per alkene molecule, preferably 4 to 8. The amount of the alkene comonomer is generally sufficient to cause the density of the polymer to be substantially in the same density range as LDPE, due to the alkyl side chains on the polymer molecule, yet the polymer remains in the "linear" classification; they are conveniently referred to as "linear low density polyethylene" (LLDPE). These polymers retain much of the strength, crystallinity, and toughness normally found in HDPE homopolymers of ethylene, but the higher alkene comonomers impart high "block" characteristics to extrusion-cast films and the high "slip" (i.e. low coefficient of friction) characteristic inherently found in HDPE is diminished.

Slip and antiblock agents are often added to LDPE film compounds to insure proper film handling characteristics. "Slip", basically defined as the coefficient of sliding friction, may be adjusted by incorporating certain additives, e.g., fatty acid amides. "Blocking", the tendency of film to stick to itself, can be reduced by adding finely divided inorganic fillers such as silica. HDPE homopolymers with densities of above about 0.940 gm./cc. generally show good slip properties (that is, they slide across each other with ease), and slip agents are not normally required.

Closely related art is found, e.g., in U.S. Pat. Nos. 2,991,265; 3,324,060; 3,463,751; 3,470,122; 3,595,827; and 3,362,839.

Other art, believed to be of less relevency is found, e.g., in U.S. Pat. Nos. 3,658,980; 2,879,244; 3,070,462; 3,121,914; 3,387,073: and 3,499,950.

SUMMARY OF THE INVENTION

Blown films of certain high molecular weight, linear low density ethylene copolymers which inherently have high block and low slip characteristics are compounded with a secondary fatty acid amide and a finely divided inorganic powder, such as silica, before being blown into a thin film. The additives serve to provide a fast bloom of the amide to the film surfaces and to improve the slip properties.

DETAILED DESCRIPTION OF THE INVENTION

In our descriptions we use the expression "fast bloom" to indicate that the effect of the additives on the surface properties of the film is evidenced in a short period of time after fabrication of the film. A "slow bloom" is one wherein the effects on the surface are not appreciable until a substantial amount of time has passed. We have found that a "fast bloom" of less than about 2 minutes, preferably 1 minute or less, is generally suitable if the additives reduce the film-to-film slip angle, during that time, to less than about 22°, preferably less than about 20°.

The high molecular weight, linear low density ethylene copolymers within the purview of the present invention are those made under conditions which are conducive to preparation of linear polymers such as are prepared using coordination catalysts, e.g., the well-known Ziegler, Natta, or Phillips catalysts, and the like. This includes those made at low, intermediate, or high pressures. The instant ethylene polymers contain minor amounts (generally about 5% to about 20% by weight) of at least one alpha-olefin comonomer selected from the group consisting of propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, 1-isodecene, and the like. The amount of comonomers used is enough to result in polymer densities in the low range of about 0.90–0.94 gms./cc. The instant copolymers are also characterized as being high molecular weight, having a melt index (melt flow) in the range of about 0.1 to about 30 gm./10 min. as measured by ASTM-D-1238 condition (E), and as having, inherently, high block and low slip characteristics. Such polymers are ideally suited for use where high or moderate strength, blown tube films are used as packaging materials, but a low slip tendency is detrimental when the blown film bubble is collapsed, cut, and employed in high-speed packaging operations, usually automated. A low slip tendency often causes equipment fouling, considerable down-time and imperfect products. Though the nature of this phenomenon is not fully understood, it appears that when enough of the higher alkene comonomers are used in the linear ethylene copolymer to result in a relatively low density polymer (i.e., about 0.90 to about 0.94 gms./cc), the pendent alkyl groups provide surface phenomena or surface properties which result in high block and low slip.

The term "block" is used here to describe the adhesion of two layers of the film to each other by the application of even slight compression and where pulling apart of the layers is likely to create even small changes in the film and/or handling problems. Such "blocking" is also somewhat dependent on, or responsive to, the amount of compression applied as well as to the duration of the compression and to the temperature. "Destructive block" refers to tendencies to form substantially irreversible adhesion where peeling apart is likely to cause deformation or tearing of the film; such "destructive block" can occur even when compression forces are small, such as when rolls of the film are made during manufacture, especially when the rolls are prepared, stored, or shipped under very warm or hot conditions.

It is an object of the present invention to substantially reduce the blocking characteristics in the above-described polymers, thereby improving the handling characteristics of blown films prepared from the polymers.

It is a further object to increase the slip, i.e., to decrease the coefficient of friction of films blown from the polymers, thereby improving handling in high-speed packaging operations.

These and other objects are substantially attained by incorporating into the above-described polymers certain additives, as described below, prior to blowing the polymer into a thin film product.

The compositions of the present invention comprise the LLDPE containing, generally, about 0.05 to about 1.5 weight percent, preferably about 0.1 to about 0.5 weight percent, of the secondary fatty acid amide along with about 0.01 to about 2.0 weight percent, preferably about 0.05 to about 0.6 weight percent, of the finely-divided inorganic. The additives are more fully identified hereinafter. By using both additives, better results are obtained in both block and slip improvement than when each is employed independently, in different samples, for either or both of these purposes. In other words, the inorganic appears to amplify or improve the ability of the amide additive to lower the coefficient of friction and the amide appears to amplify or improve the ability of the inorganic to reduce the block. The compositions may be prepared by mixing a concentrated masterbatch with virgin polymer such as described hereinafter.

The secondary fatty acid amides useful in the present invention conform essentially to the empirical formula

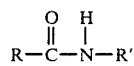

where R and R', independently, represent alkyl groups having 10 to 26 carbon atoms, both of which may be saturated or unsaturated alkyls, or one of which may contain olefinic unsaturation. These secondary acid amides are polar compounds which are both hydrophilic and lyophilic; in other words they are "amphipathic". For use with blown films, it is preferred that one of the alkyl groups be saturated and the other be unsaturated.

Compounds which conform to the above empirical structure are, e.g., oleyl palmitamide, stearyl erucylamide, erucyl stearamide, oleyl stearamide, and the like. Other compounds which conform to the structure are, e.g., those wherein R or R' represent the following groups:

| | |
|---|---|
| erucyl | behenyl |
| linoleyl | arachidyl |
| linolenyl | stearyl |
| arachidonyl | palmityl |
| palmitoleyl | lignoceryl |
| elaidyl | oleyl |
| vaccenyl | |

The inorganic materials are, e.g., clay, aluminum silicate, diatomaceous earth, silica, talc, limestone, fumed silica, magnesium sulfate, magnesium silicate, alumina trihydrate, magnesium oxide, zinc oxide, and the like, with the siliceous materials being preferred. The inorganic preferably has an average particle size in the range of about 0.02 to about 40 microns, a surface area of about 0.7 to about 100 m$^2$/gm, and an oil absorption value of about 21 to about 175 parts of oil per 100 parts inorganic.

A masterbatch of the LLDPE with high loadings of the secondary amide and the naturally-occurring inorganic mineral may be blended or "let-down" with additional quantities of polyethylene to achieve the desired loading in films fabricated from the blend. For instance, about 100 parts of a masterbatch of LLDPE, containing about 4% of the secondary amide and about 1.5% of the inorganic, may be blended with additional polymer to give a total blend containing e.g., about 2000 ppm amide and about 750 ppm inorganic. This masterbatch technique may be used with LDPE, HDPE, LLDPE, or other olefin polymers or copolymers.

Blown films of LLDPE prepared in the practice of this invention generally contain from about 96.5 to about 99.94 weight percent of polymerized olefins and from about 0.06 to about 3.5 weight percent of the mixture of additives. While effective amounts and preferred concentrations of the additives vary somewhat with the density of the LLDPE, the temperature of fabrication, the choice of additives, and the smoothness of the film surface, generally preferred concentrations of the mixture of additives for the purposes of the invention range from about 0.15 to about 0.9 weight percent. As a rule the smooth surface films require more additives for a given amount of block-reduction than do the rough surface films, e.g., an embossed film. For example, whereas a particular smooth surface linear LDPE film may require as much as about 0.5 to 1.5 weight percent of the amide to give a certain block-reduction, only about, say, 0.10–0.5 weight percent of the same amide may be sufficient to give the same block-reduction in an embossed film. Usually, then, the amount of amide is in the range of about 0.05–1.5%, preferably about 0.1–0.5%, and the amount of inorganic is in the range of about 0.01–2.0%, preferably about 0.05–0.6% by weight of the total blend.

Too much inorganic for a given amount of amide will often result in slow bloom; conversely, too small an amount will often result in the amide plating out on the film surface. Thus, the ratio of amide/inorganic should be, generally, in the range of about 0.5 to about 5.0; preferably the ratio should be in the range of about 1.25 to about 5.0, especially if SiO$_2$ is used as the inorganic.

The films according to this invention are readily prepared by (1) intimately admixing the olefin copolymer with the additives and (2) extruding the resulting mixture in the form of a clear, flexible, blown bubble tube which is subsequently cooled and collapsed onto rolls or is collapsed and conveyed through appropriate heat-sealers and cutters to make bags having an average wall thickness in the range of about 0.3 mil to about 8.0 mils. The linear low density ethylene polymers may also be co-extruded (by a double-bubble method) with ordinary ethylene polymers so that the ordinary polymers form very thin outer, adhered layers on one or both sides of the linear low density polymers.

Mixing of the required components is readily carried out in a conventional mixing apparatus such as a Banbury mixer or screw type extruder. In one embodiment wherein the mixing device is a screw type extruder, the additives are fed into the barrel of the extruder. The extruded mixture may be mixed with additional polymer(s) prior to final extrusion or may be fed directly into an extruder equipped with an annular die and extruded in the form of an inflated bubble or thin-wall parison.

In a preferred embodiment the mixing and extruding steps are carried out in a single apparatus which is a typical screw type extruder that is equipped with a circular die and feed means placed along the extruder barrel which houses the screw or screws of the extruder. The block-reducing additive and the slip-improving additive are introduced as the polymer is being extruded at a rate such that a constant mixture is maintained. Similarly, concentrated masterbatches can be added to virgin material in the screw-type extruder.

The effect of various additives on slip and block characteristics of the polymer are tested by incorporating the additives into the polymer and extruding the mixture into film by the blown film method.

To measure the slip angle, the following test was devised:

Slip angle is measured on an inclinable flat, smooth plane equipped with a driving means which lifts one end of the plane through an increasing angle of 2.5° per second. A 1000-gm stainless steel block of 4"×2.5"×0.75" thick is used as the sample holder. Film samples are tested in a testing lab kept at about 23° C. and 50% R.H. A 4"×6" sample film specimen is affixed to the lower side of the steel block by using adhesive tape on the film edges on top of the steel block; it is mounted so that the machine-direction of the film is aligned along the 4" direction of the steel block and along the path of slip. For film-to-film testing, another film specimen is affixed to the inclinable surface and the film on the steel block is placed on that. For film-to-metal testing, a smooth metal plate is used on the plane. A limit switch is affixed to the inclinable plane approximately 0.25" from the steel block. As the plane is elevated at one end and the steel block slips down the plane, it actuates the limit switch which stops the driving force and the angle (from horizontal) is measured. Ordinarily three tests are made and the average is recorded as the slip angle.

For measuring film-to-film slip angles to determine fast bloom of freshly prepared blown films, so as to make the measurements shortly after the blown film bubbles have been collapsed, we have adapted the technique of cutting a fresh sample immediately after the film comes from the nip rollers and starting a stopwatch and quickly running the slip test described above in order to determine if fast bloom has occurred within a specified time.

The following examples are given as illustrations of the invention and are not to be construed as limiting its scope. Throughout this specification and claims, all parts and percentages are by weight unless otherwise indicated.

EXAMPLE 1

A blown film sample was prepared by first compounding the following ingredients at 177° C. in a 6.35 cm, 20/1 L/D compounding extruder equipped with a metering, compression and mixing section:

49.8125 parts of LLDPE(~8% 1-octene, 5M.I., 0.918 g/cc)
0.125 parts of aluminum silicate
0.0625 parts of stearyl erucamide.

The pellitized product from the mixer was fabricated into 8.89 cm lay flat film by usual inflation techniques on a 2.54 cm Killian extruder, 20/1 L/D, at 210° C. plastic temperature. The resultant film sample possessed a film-to-film slip angle of 20.5° within one minute and 20° within two minutes, and had good handling properties.

In comparison thereto, the above procedure was performed without the amide and inorganic. The resultant film had severe handling problems and exhibited a film-to-film slip angle one minute after fabrication of 35°; one hour after fabrication the slip angle was still 35°.

EXAMPLE 2

Using an LLDPE (~8% 1-octene, 5 M.I., 0.918 g/cc) the following illustrations were compounded and blown into films essentially as in Example 1 above. In the following table, amide A* is erucamide, amide B is stearyl erucamide, the silica is $SiO_2$ with median particle size of about 8 microns, and the talc has a median particle size of about 1 micron.

| | Additive, ppm | | | Film-to-Film Slip Angle | |
|---|---|---|---|---|---|
| Run | Amide | Silica | Talc | at 1 min., (degrees) | 2 min. |
| 1 | none | none | none | 35 | 35 |
| 2 | A, 2000 | 1000 | none | 27.5 | 24 |
| 3 | B, 2000 | 1000 | none | 21 | 20 |
| 4 | A, 1250 | none | 2500 | 28 | 26 |
| 5 | B, 1250 | none | 2500 | 20.5 | 20 |

*Amide A is not example of invention and is provided for comparison.

EXAMPLE 3

In accordance, essentially, with the procedure of Example 2 above, the following data are obtained, using the same LLDPE, using stearyl erucamide, using silica as defined in Example 2 and using talc, having an average particle size of about 1 micron.

| | Stearyl Erucamide | Talc | Silica | Film-to-Film Slip Angle at | |
|---|---|---|---|---|---|
| Run | ppm | ppm | ppm | 1 min., (degrees) | 2 min. |
| 1 | 2000 | 750 | none | 19 | 19 |
| 2 | 2000 | none | 750 | 18 | 17.5 |
| 3 | 1500 | none | none | 25 | 24.5 |
| 4 | none | none | 1500 | 35 | 35 |
| 5 | none | none | none | 35 | 35 |
| 6 | 2500 | none | 2000 | 28 | 27 |

We would not wish to be unduly bound by the following postulations, but based on our observations it appears that conventional primary amide-organic filler compositions effectively reduce the coefficient of friction (increase slippage) and the blocking properties of polyolefinic films (provided more than 60 seconds is allowed to enable the amide to migrate to the film surface). This "slow-blooming" characteristic of these compositions typically does not resolve fabrication difficulties. However, secondary fatty acid amide-inorganic filler compositions can be used to resolve the difficulties of in-process cutting, sealing and/or filling of polyolefinic bags which are normally handled by automated equipment. The fast bloom rates (a duration of less than 60 seconds) of these compositions prevent equipment fouling due to film surfaces and/or bags adhering to one another. Additionally, secondary amide-inorganic filler compositions synergistically improve the handling properties of olefinic films. These films not only exhibit adequate handling properties within 60 seconds, but this property is retained in the film.

It also appears that the effective uniqueness of secondary amide-inorganic filler compositions is obtained by virtue of the relatively large surface area and small median particle size of the inorganic, and the incompatibility (due to a strong polar chain) of the amide in the polyolefinic matrix. These physical properties allow a fortuitous balance between the absorptive characteristics of the inorganic and the unusually rapid exudation rate of the amide; i.e., the inorganic can be used to control the bloom rate of the amide. At typical fabrication temperatures (greater than 177° C.), in the absence of an inorganic filler, the amide readily "plates-out" (complete exudation beyond the film surface) and thereby can create equipment fouling. This undesirable plating phenomena essentially wastes the amide since the additive collects on cold chill rolls and on take-off equipment. Inorganic fillers function as an antiblock additive by producing imperfections at the film surface and thereby mitigating surface contact between adjoining layers of film. However, the present secondary fatty acid amides function as both slip and anti-block additives. They improve film slip properties by rapidly exuding to the film surface and forming a highly oriented monolayer. This orientation is a low shear boundary layer which serves to reduce the coefficient of friction between adjacent film layers or a film and a metal surface. Present secondary amides reduce film blocking by raising the freezing point of the film surface. This effect expedites surface crystallization of low molecular weight polymer fractions and thus reduces the chance for adhesion between two tacky film surfaces.

We claim:

1. An extrusion-blown film consisting essentially of a blend of polymer, secondary fatty acid amide, and finely-divided inorganic material, said polymer being characterized as one comprising ethylene copolymerized with a minor amount of at least one alpha, beta-ethylenically-unsaturated alkene having from 3 to 12 carbon atoms by the action of a coordination catalyst to produce a linear, low density copolymer, LLDPE, having a density in the range of about 0.90 to about 0.94 gms./cc and a melt flow value in the range of about 0.1 to about 30 gm./10 min. as measured by ASTM-D-1238(E) and said amide being characterized as having 2 alkyl moieties, one of which is saturated and the other of which is unsaturated, said inorganic material being at least one selected from the group comprising talc, limestone, silica, aluminum silicate, diatomaceous earth, magnesium silicate, clay, magnesium sulfate, alumina trihydrate, magnesium oxide, and zinc oxide, wherein the said polymer comprises about 96.5% to about 99.94% by weight of the total blend, the remaining portions of the blend comprising about 0.05% to about 1.5% by weight of the said amide, and about 0.01% to about 2.0% by weight of the said inorganic material said extrusion-blown film having an average film wall thickness in the range of about 0.3 to about 8 mils, said film being further characterized as a fast-bloom film.

2. The film of claim 1 wherein the ratio of amide/inorganic is in the range of about 0.5 to about 5.

3. The film of claim 1 wherein the secondary fatty acid amide is at least one selected from the group comprising stearyl erucamide, oleyl palmitamide, erucyl stearamide, stearyl stearamide, erucyl erucamide, and oleyl erucamide.

4. The film of claim 1 wherein the inorganic material is selected from the group comprising talc, silica, aluminum silicate, diatomaceous earth, limestone, magnesium silicate, magnesium sulfate, alumina trihydrate, magnesium oxide, and zinc oxide.

5. The film of claim 1 wherein the alkene is at least one selected from the group consisting of propylene, butene, isobutene, pentene, isopentene, hexene, isohexene, heptene, isoheptene, octene, isooctene, nonene, isononene, decene, and isodecene.

6. The film of claim 1 wherein the alkene is at least one of octene, heptene, hexene, pentene, butene, and propylene.

7. The film of claim 1 wherein the secondary fatty acid amide conforms essentially to the empirical formula R—CO—NH—R', where R and R' each, independently, are alkyl groups having 10 to 26 carbon atoms wherein one of the alkyl groups is saturated and the other is unsaturated.

8. The film of claim 1 wherein the finely-divided inorganic material comprises silica and/or diatomaceous earth having a surface area of about 0.7 to about 100 m$^2$/gm., an oil absorption value of about 21 to about 175 parts oil per 100 parts inorganic, and an average particle size of about 0.02 to about 40 microns.

9. The film of claim 1 wherein the secondary fatty acid amide conforms essentially to the empirical formula R—CO—NH—R', where R and R' represent, independently, alkyl moieties selected from the group of fatty acids comprising erucyl, linoleyl, linolenyl, arachidonyl, palmitoleyl, elaidyl, vaccenyl, behenyl, arachidyl, stearyl, palmityl, lignoceryl, and oleyl, and where one of the alkyl moieties is saturated and the other is unsaturated.

10. The film of claim 1 wherein the secondary fatty acid amide is at least one of stearyl erucylamide, oleyl palmitamide, and oleyl erucylamide.

11. The film of claim 1 wherein the finely-divided inorganic comprises talc.

12. The film of claim 1 wherein the finely-divided inorganic comprises limestone.

13. The film of claim 1 wherein the finely-divided inorganic comprises siliceous material.

14. The film of claim 1 wherein the finely-divided inorganic comprises silica.

* * * * *